United States Patent
Prasad et al.

(10) Patent No.: US 6,793,455 B2
(45) Date of Patent: Sep. 21, 2004

(54) METHOD AND APPARATUS FOR ACTIVE CONTROL OF SURGE IN COMPRESSORS

(75) Inventors: Jonnalagadda V. R. Prasad, Roswell, GA (US); Yedidia Neumeier, Dunwoody, GA (US); Assaad Krichene, West Henrietta, NY (US); Manuj Dhingra, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 0 days.

(21) Appl. No.: 10/068,919

(22) Filed: Feb. 8, 2002

(65) Prior Publication Data

US 2002/0129607 A1 Sep. 19, 2002

Related U.S. Application Data

(60) Provisional application No. 60/267,513, filed on Feb. 8, 2001.

(51) Int. Cl.⁷ ............................. F04D 27/02; F02C 9/16
(52) U.S. Cl. ........................... 415/1; 415/26; 60/39.27; 60/772
(58) Field of Search ............. 60/39.27, 39.281, 60/772, 795; 415/1, 27, 26

(56) References Cited

U.S. PATENT DOCUMENTS

| | | | | |
|---|---|---|---|---|
| 3,671,134 A | * | 6/1972 | Boothe | ........................ 415/13 |
| 4,164,034 A | * | 8/1979 | Glennon et al. | .............. 60/795 |
| 4,662,817 A | * | 5/1987 | Clark et al. | .................... 415/1 |
| 5,385,012 A | * | 1/1995 | Rowe | .......................... 60/772 |

OTHER PUBLICATIONS

J.V.R. Prasad, Yedidia Neumeier, Assaad Krichene, "Active Control of Compressor Surge Using a Real Time Observer," paper presented at NATO Symposium May 8–11, 2000, 10 pages.

* cited by examiner

*Primary Examiner*—Louis J. Casaregola
(74) *Attorney, Agent, or Firm*—Thomas, Kayden, Horstemeyer & Risley LLP

(57) ABSTRACT

Methods for avoiding surge in a compressor are provided. A representative method includes detecting precursor information of the compressor and controlling the compressor based on the precursor information to avoid a surge condition in the compressor. The control scheme for the method uses a real time observer for on-line identification of magnitude and frequency of dominant precursor waves. The observer outputs feed into a fuzzy logic control scheme, and the identified frequency and amplitude of the precursors are used to actuate devices, such as a bleed valve and/or a fuel valve, for active control of compressor surge. Systems and other methods are provided.

16 Claims, 5 Drawing Sheets

METHOD AND APPARATUS FOR ACTIVE CONTROL OF SURGE IN COMPRESSORS

CROSS REFERENCE TO RELATED APPLICATIONS

This application claims the benefit of and priority to U.S. Provisional Patent Application Serial No. 60/267,513, entitled "Method and Apparatus for Active Control of Surge in Compressors," filed Feb. 8, 2001, which is incorporated herein by reference in its entirety.

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of DAAH04-96-1-0008 awarded by the U.S. Army Research Office.

FIELD OF INVENTION

The present invention is generally related to engine controllers and, more particularly, is related to systems and methods for active control of surge in compressors, such as axial and centrifugal compressors.

BACKGROUND

The design and operation of jet engines are faced with many challenges that limit the operating range of those engines. Among those challenges are aerodynamic phenomena that occur in the compression system such as rotating stall and surge. Rotating stall manifests itself as a region of severely reduced flow that rotates at a fraction of the compressor rotational speed and causes a drop in performance. Surge is a pumping oscillation that can cause flame-out and engine damage.

Due to the importance of these phenomena, considerable effort in compression system studies has been focused primarily on the design and implementation of active control schemes to ensure stable operation of the compression system over a wide range of operating conditions. However, those schemes, in their majority, are based on sensing after those phenomena have occurred and then taking appropriate control action. But the severity of those phenomena and their impact on the engine performance make it highly desirable to have a controller that is able to avoid the operation of the compressor in a region where the compressor is susceptible to those phenomena.

SUMMARY

The present invention provides methods and systems for potentially avoiding a surge condition.

Briefly described, one embodiment of the system comprises a compressor, a combustor, a control computer, and a transducer. The transducer, which is located in the compressor, provides a pressure signal to the control computer. The control computer uses the pressure signal to proactively control a device, such as a bleed air valve or fuel valve, to avoid a surge condition in the compressor.

The present invention can also be viewed as providing a method for active control of surge in a compressor. In this regard, one embodiment of such a method, can be broadly summarized as including: detecting precursor information of the compressor; and controlling the compressor based on the precursor information to avoid a surge condition in the compressor.

One embodiment of the control scheme for the present invention uses a real-time observer for on-line identification of magnitude and frequency of dominant precursor waves. The observer outputs feed into a fuzzy logic control scheme, and the identified frequency and amplitude of the precursors are used to actuate devices, such as a bleed valve and/or a fuel valve, for active control of compressor surge.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
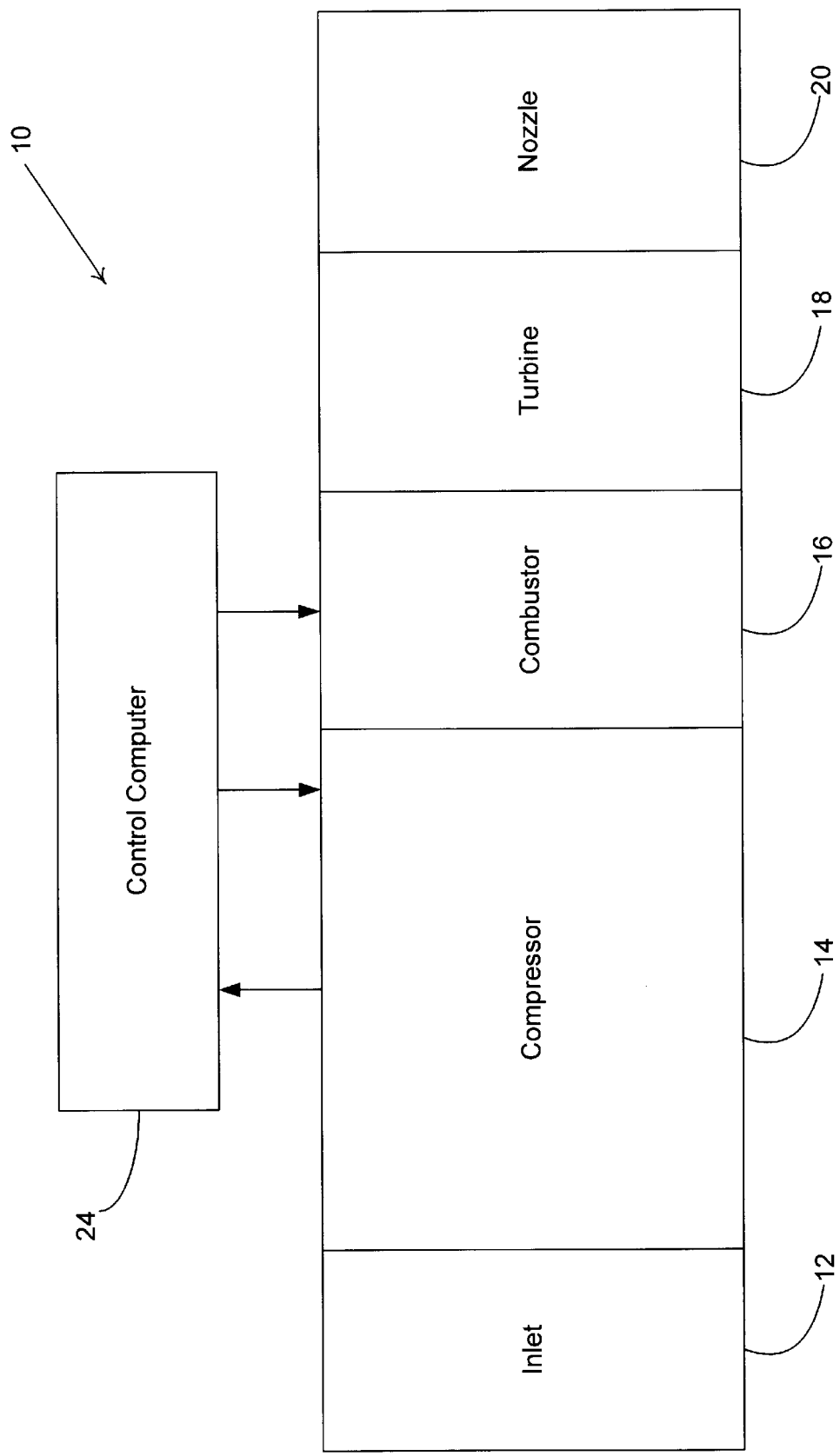
FIG. 1 is a block diagram showing the stages of a jet engine.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

The systems and methods described below provide control of a compressor to avoid surge conditions by detecting precursor information and controlling devices in the compressor system to avoid entering a surge condition.

System

FIG. 1 is a block diagram showing the stages of a typical turbo jet engine, referenced generally as 10, that can be used to implement the present invention. Engine 10 includes an inlet 12, compressor 14, combustor 16, turbine 18, nozzle 20, and control computer 24. Incoming air is received by inlet 12. The pressure of the incoming air is increased by compressor 14 before it enters combustor 16. In combustor 16 fuel is combined with the high pressure air and burned. The resulting high temperature exhaust gas is used to turn turbine 18 and produce thrust when passed through nozzle 20. Control computer 24 receives information from compressor 14 and controls a device or devices in compressor 14 and/or combustor 16 to avoid surge conditions in the compressor. This invention is equally applicable to other types of propulsion systems, such as those that use turbo-shaft engines.

Figure 2:
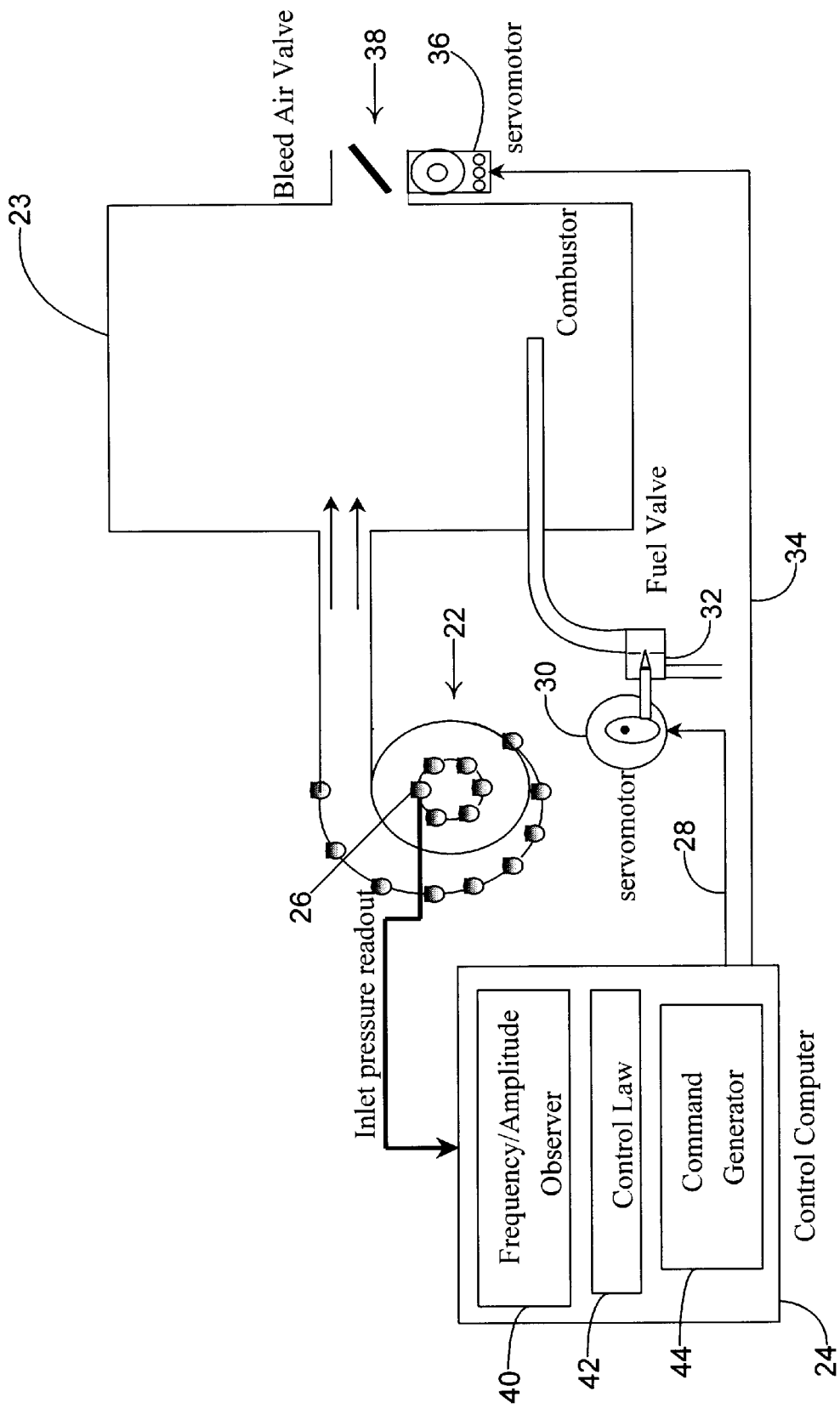
FIG. 2 is a diagram showing one embodiment of the invention used with a centrifugal compressor.

FIG. 2 is a diagram of one embodiment of the invention for a centrifugal compressor 22 and combustor 23. The flow through centrifugal compressor 22 is turned perpendicular to the axis of rotation and is provided to combustor 23. A control computer 24 receives an inlet pressure signal from a transducer 26 located in centrifugal compressor 22. Control computer 24, using the inlet pressure signal, provides appropriate control signals on line 28 to a servomotor 30 controlling fuel value 32 and/or line 34 to a servomotor 36 controlling a bleed air valve 38.

Control computer 24 includes an observer 40, control laws 42, and a command generator 44. Observer 40 is capable of real-time identification of amplitude, frequency, and/or phase of one or more dominant waves present in the inlet pressure signal. Observer 40 may also be capable of identifying the measure of disorder in the flow in the compressor using cross and/or auto correlation of the pressure signal. Control laws 42 use the outputs of observer 40 to control command generator 44 to apply the appropriate commands to servomotors 32, 36 for fuel valve 34 and bleed air valve 38.

The objective of control computer 24 is to achieve maximum attainable pressure from the compressor while avoiding surge. When controlling the bleed air valve, the controller does not allow the actual position of the bleed air valve to restrict flow below that which is necessary to keep the system from surging while maintaining plenum pressure, e.g., maximum plenum pressure. When controlling the fuel valve, the controller starts reducing the fuel flow in order to prevent the appearance of surge while maintaining the maximum plenum pressure.

Figure 3:
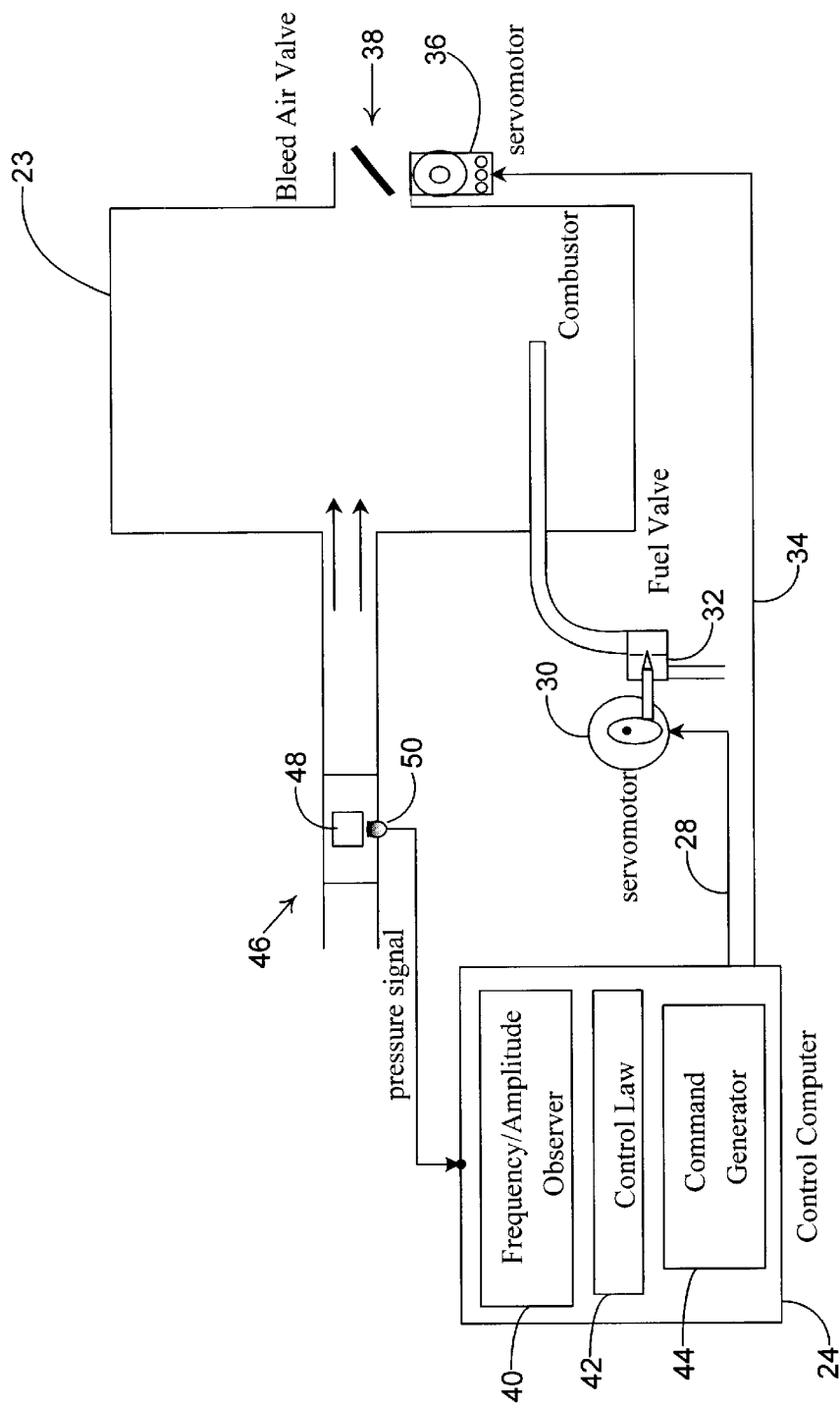
FIG. 3 is a diagram showing an alternative embodiment of the invention used with an axial compressor.

FIG. 3 is a diagram of an alternative embodiment of the invention for an axial compressor 46 and is very similar to FIG. 2 except for the change of compressors. The flow through axial compressor 46 is parallel to the axis of rotation. Axial compressor 46 includes at least one blade row 48. Transducer 50 is located above blade row 48 to efficiently provide definite information on stall/surge precursors. The control of the fuel valve and bleed air valve for the compressor and combustor is the same as described for FIG. 2 above.

Figure 4:
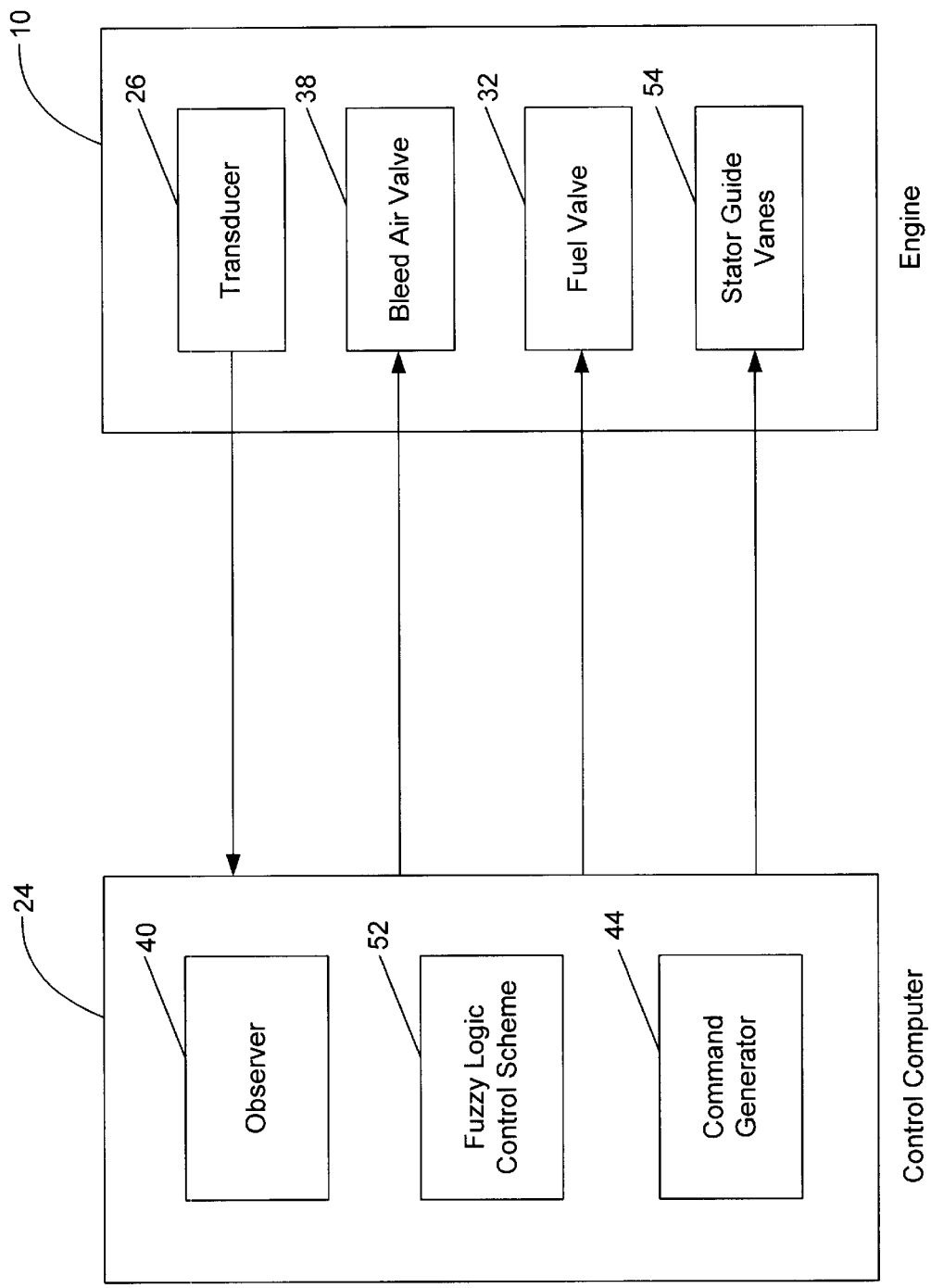
FIG. 4 is a block diagram showing an interface between the control computer and the engine.

FIG. 4 is a block diagram of control computer 24 interfacing with engine 10. Control computer 24 includes a fuzzy logic control scheme 52 for the control laws to control command generator 44 using the inputs from observer 40. Engine 10 further includes stator guide vanes 54 which are also controllable by control computer 24 to keep the compressor from enter stall/surge.

Although only three types of control actuation discussed above, fuel valve, bleed air valve, and stator guide vane actuation, other available methods of control actuation may be utilized to keep the compressor from entering a stall/surge condition. The fuel control scheme offers inherent advantages, such as greater control authority and overheating protection of the turbine. In an engine, reducing the fuel flow when the compressor gets closer to surge is very desirable since this reduces the temperature, thus protecting the engine components from damage.

Method

Figure 6:
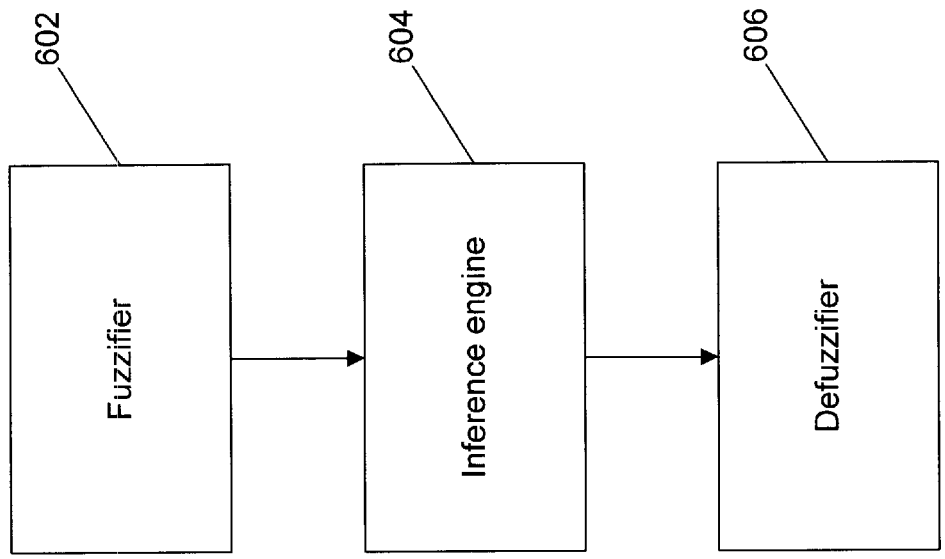
FIG. 6 is a flow diagram showing a fuzzy logic control scheme used in the calculating step of FIG. 5.
Figure 5:
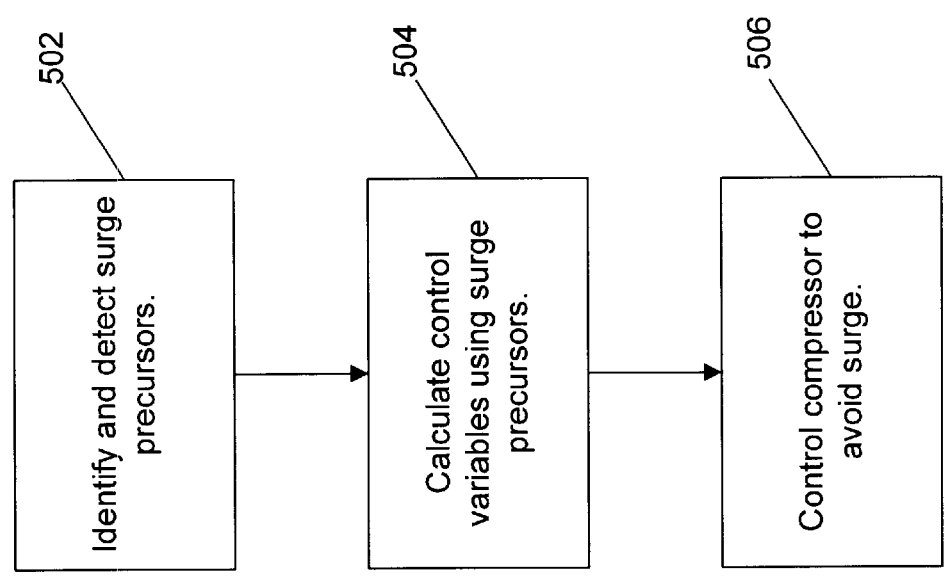
FIG. 5 is a flow diagram showing one embodiment of the method according to the invention.

Having discussed non-limiting examples of systems configured to avoid a stall/surge condition in a compressor, a corresponding method is presented in FIGS. 5 and 6, which show a non-limiting method for avoiding a stall/surge condition in a compressor.

FIG. 5 is a flow diagram of an embodiment of a method of avoiding a stall/surge condition in a compressor. The first step in block 502 is to identify and detect at least one surge precursor of the compressor. Next, control variables are calculated using the surge precursor as shown in block 504. Then, in block 506 the control variables are used to proactively control devices in the engine to avoid stall/surge.

For the centrifugal compressor, the method is implemented using a pressure transducer located at the inlet side of the compressor. An observer capable of real-time identification of amplitude, frequency and/or phase of one or more dominant waves present in a signal identifies, e.g., continuously identifies, the frequency and/or amplitude of dominant waves in the pressure signal. A fuzzy logic scheme (See FIG. 6) is synthesized to make use of the identified frequency and amplitude outputs from the observer and apply appropriate commands to the actuators of a bleed valve, a fuel valve, stator guide vane, or other appropriate control mechanism. The objective of the controller is to achieve maximum attainable pressure from the compressor while avoiding surge. The controller achieves this objective with very little knowledge of the compressor characteristic map.

The fuzzy logic scheme includes a fuzzifier 602, an inference engine 604, and a defuzzifier 606. The inputs to the fuzzifier are the frequency distance $|\Delta f|$ and the amplitude difference $\Delta A$. The frequency distance $|\Delta f|$ is the absolute value of the difference between the identified frequency and the expected frequency of precursors which depends on compressor rpm, i.e., $|\Delta f|=|$Identified Frequency$-$Expected Frequency$|$. Likewise, $\Delta A$ is the difference between the identified amplitude and a threshold amplitude. These inputs are fuzzified using triangular membership functions with two fuzzy sets ("Small" and "Big") for each input.

The fuzzified values of the frequency distance and amplitude difference are then passed through the inference engine consisting of user specified rule-base. The output consists of three fuzzy sets, viz., "Negative (N)," "Approximately Zero (AZ)" and "Positive (P)."

The fuzzy membership of the output is calculated using Sugeno's product inferencing procedure as follows:

$$x_N = \min(\mu_S(\Delta A), \mu_S(|\Delta f|)) +$$
$$\min(\mu_S(\Delta A), \mu_B(|\Delta f|))$$

The crisp value of control used to control at least one of the control mechanism is obtained using the weighted average of the fuzzy output values.

$$\text{control}=w_N x_N + w_{AZ} x_{AZ} + w_P x_P$$

where $w_N$, $W_{AZ}$ and $w_P$ are pre-selected output weights.

The detection of precursor information may also be accomplished by measuring pressure signals in locations where blade passing frequency content exists and observing auto correlation of the measured signals with or without cross correlation of the measured pressure signals to obtain a measure of disorder in the flow.

One implementation of the method for an axial compressor would be similar to the implementation described above for the centrifugal compressor, but changing the transducer location from the compressor inlet to above the blade row in the axial compressor, for example.

Although an exemplary embodiment of the present invention has been shown and described, it will be apparent to those of ordinary skill in the art that a number of changes, modifications, or alterations to the invention as described may be made, none of which depart from the spirit of the present invention. All such changes, modifications, and alterations should therefore be seen as within the scope of the present invention.

We claim:

1. A method of active control of surge in a compressor, comprising:

detecting precursor information of the compressor, wherein detecting precursor information includes measuring flow information of the compressor and observing frequency and amplitude of a dominant wave of the flow information; and controlling the compressor based on the precursor information to avoid a surge condition in the compressor.

2. The method of claim 1, wherein the flow information is a pressure of the compressor.

3. The method of claim 2, wherein the pressure is an inlet pressure of the compressor.

4. The method of claim 3, wherein controlling the compressor includes controlling the inlet pressure of the compressor.

5. The method of claim 1, wherein controlling the compressor includes controlling a fuel valve of a combustor coupled to the compressor.

6. A method of active control of surge in a compressor, comprising:

detecting precursor information of the compressor, wherein detecting precursor information includes measuring flow information at locations where blade passing frequency content exists and observing cross correlations and auto correlations of the measured flow information to obtain a measure of disorder in the flow information; and controlling the compressor based on the precursor information to avoid a surge condition in the compressor.

7. The method of claim 6, wherein the flow information is a pressure of the compressor.

8. The method of claim 7, wherein the pressure is an inlet pressure of the compressor.

9. The method of claim 8, wherein controlling the compressor includes controlling the inlet pressure of the compressor.

10. The method of claim 6, wherein controlling the compressor includes controlling a fuel valve of a combustor coupled to the compressor.

11. A method of active control of surge in a compressor, comprising:

detecting precursor information of the compressor, wherein detecting precursor information includes measuring flow information at locations where blade passing frequency content exists and observing auto correlation of the measured flow information to obtain a measure of disorder in the flow information; and controlling the compressor based on the precursor information to avoid a surge condition in the compressor.

12. The method of claim 11, wherein the flow information is a pressure of the compressor.

13. The method of claim 12, wherein the pressure is an inlet pressure of the compressor.

14. The method of claim 13, wherein controlling the compressor includes controlling the inlet pressure of the compressor.

15. The method of claim 11, wherein controlling the compressor includes controlling a fuel valve of a combustor coupled to the compressor.

16. An apparatus for controlling a compressor, comprising:

means for identifying at least one surge precursor of the compressor, wherein means for identifying at least one surge precursor includes measuring flow information of the compressor and observing frequency and amplitude of a dominant wave of the flow information; and means for controlling the compressor using the surge precursor to proactively prevent the compressing from entering a surge condition.

* * * * *

UNITED STATES PATENT AND TRADEMARK OFFICE
CERTIFICATE OF CORRECTION

PATENT NO.    : 6,793,455 B2
DATED         : September 21, 2004
INVENTOR(S)   : Prasad et al.

It is certified that error appears in the above-identified patent and that said Letters Patent is hereby corrected as shown below:

<u>Column 4,</u>
Line 46, insert the following equations:
-- $x_{AZ} = \min(\mu_B(\Delta A), \mu_B(|\Delta f|))$
$x_P = \min(\mu_B(\Delta A), \mu_S(|\Delta f|))$ --

Signed and Sealed this

Thirtieth Day of November, 2004

JON W. DUDAS
*Director of the United States Patent and Trademark Office*